United States Patent [19]
Grunwell et al.

[11] 3,917,831
[45] Nov. 4, 1975

[54] 3-KETO-7 $\alpha,\beta$-LOWERALKYL-$\Delta$ 5-STEROIDS

[75] Inventors: Joyce F. Grunwell; Harvey D. Benson; Vladimir Petrow, all of Cincinnati, Ohio

[73] Assignee: Richardson-Merrell Inc., Wilton, Conn.

[22] Filed: June 4, 1974

[21] Appl. No.: 476,330

Related U.S. Application Data

[62] Division of Ser. No. 236,186, March 20, 1972, Pat. No. 3,833,621.

[52] U.S. Cl. ............... 424/243; 424/241; 424/242
[51] Int. Cl.² ............................................ A61K 31/56

[56] References Cited
UNITED STATES PATENTS

| | | | |
|---|---|---|---|
| 2,224,856 | 12/1940 | Butenandt | 260/397 |
| 2,248,954 | 7/1941 | Butenandt | 260/397.3 |
| 2,320,847 | 6/1943 | Butenandt | 260/397.2 |
| 3,262,949 | 7/1966 | Ringold et al. | 260/397.3 |
| 3,833,621 | 9/1974 | Grunwell et al. | 260/397.4 |

OTHER PUBLICATIONS

Chem. Abstracts 33:6341
Chem. Abstracts 32:2583

*Primary Examiner*—Ethel G. Love
*Attorney, Agent, or Firm*—William J. Stein; Eugene O. Retter; George W. Rauchfuss, Jr.

[57] ABSTRACT

7($\alpha,\beta$)-Loweralkyl-3-keto-$\Delta^5$-androstanes and 7($\alpha,\beta$)-loweralkyl-3-keto-$\Delta^5$-pregnanes having anabolic, androgenic, claudogenic, progestational and anti-progestational properties are prepared by reacting 3-keto-4,6-dienic androstanes and pregnanes with organocopper reagents such as dialkyllithium cuprate. The isomerization of these compounds to yield 7($\alpha,\beta$)-loweralkyl-3-keto-$\Delta^4$-steroids is also described.

8 Claims, No Drawings

3-KETO-7 α,β-LOWERALKYL-Δ 5-STEROIDS

This is a division of application Ser. No. 236,186, filed Mar. 20, 1972, now U.S. Pat. No. 3,833,612.

DISCUSSION OF PRIOR ART

Prior to the present invention the preparation of 3-keto-7-alkyl-$\Delta^4$-steroids has been achieved via the 1,6-addition of a suitable Grignard reagent to a 3-keto-4,6-dienic steroid substrate generally via the addition of cuprous chloride or an equivalent catalyst to promote a 1,6-addition to the steroid substrate. Thus, for example, U.S. Pat. No. 3,341,557 to Babcock and Campbell, teaches the preparation of 17β-hydroxy-3-keto-7-methyl-$\Delta^4$-androstanes via a 1,6-Grignard addition to the corresponding 17-hydroxy-3-keto-4,6-androstadienes.

The prior art also teaches the preparation of 7(α,β)-methyl-3-keto-17,20:20,21-bis-methylenedioxy$\Delta^{1,5,8(10)}$ pregnatriene via a Grignard addition reaction as described by Kerb and Wiechert, Chemische Berichte 96, 2772-3(1969). No other 7(α,β)-loweralkyl-3-keto-androstanes or corresponding pregnanes which possess unsaturation in the $\Delta^5$ position are known to applicants.

The prior art also teaches the addition of organometallic reagents, in particular the addition of dimethyllithium cuprates to conjugated tetrahydronaphthalene-dienones to produce 1,4 as well as 1,6 addition adducts, as reported by Marshall et.al., Tetrahedron Letters, 41, 3795-8(1971).

The addition of organocopper reagents to 3-keto-4,6-dienic steroidal substrates, however, has heretofore been unknown. Surprisingly, it has now been discovered that the addition of certain organocopper reagents to 3-keto-4,6-androstadienes and 3-keto-4,6-pregnadienes results in the selective alkylation of the 7-position, to yield 7(α,β)-loweralkyl-3-keto-$\Delta^5$-steroids.

These novel 7(α,β)-loweralkyl-3-keto-$\Delta^5$-androstanes and 7(α,62)-loweralkyl-3-keto$\Delta^5$-pregnanes can be readily isomerized to the corresponding 7(α,β)-loweralkyl-3-keto-$\Delta^4$-steroids, which reaction can be performed in situ if desired. Because of the convenience and high yields obtained, this process of preparing 7(α,β)-loweralkyl-3-keto-$\Delta^4$-steroids via the corresponding $\Delta^5$ steroids represents a preferred method for their preparation.

SUMMARY OF THE INVENTION

This invention relates to the synthesis of an important class of new steroid compounds. More particularly this invention relates to the class of 7(α,β)loweralkyl-3-keto-$\Delta^5$-steroids belonging to the androstane and pregnane series, to a novel process for their preparation, and to a process for converting such steroids to the corresponding 7(α,β)-alkyl-3-keto-$\Delta^4$-steroids.

The androstane series of compounds claimed to be within the scope of the present invention includes compounds having the androstane, 19-nor-androstane, 9β;10α-androstane and D-homo-androstane configuration and may be illustratively represented by the following general formula:

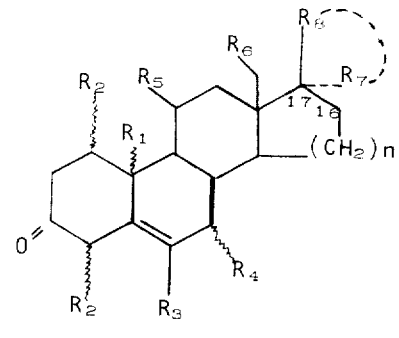

I wherein
- $R_1$ represents a member of the group consisting of hydrogen and (α,β)-methyl with the proviso that when $R_1$ is β-methyl the 9-hydrogen is in the beta configuration and when $R_1$ is β-methyl the 9-hydrogen is in the alpha configuration;
- $R_2$ is individually selected from the group consisting of hydrogen and (α,β)-methyl;
- $R_3$ is hydrogen and methyl;
- $R_4$ is an (α,β)-loweralkyl group having from 1 to 3 carbon atoms;
- $R_5$ is hydrogen and oxo;
- $R_6$ is hydrogen, methyl and ethyl;
- $R_7$ represents a member of the group consisting of hydrogen, loweralkyl, alkenyl, alkynyl, alkadienyl, alkenynyl and alkadiynyl having from 1 to 6 carbon atoms;
- $R_8$ is selected from the group consisting of hydrogen, 1-cyclopenten-1-yloxy, 1-methoxycyclohexyloxy, 2-tetrahydropyranyloxy and the group —$OR_9$, wherein $R_9$ represents hydrogen and an acyl radical having from 1 to 12 carbon atoms, with the proviso that when $R_7$ is unsaturated, $R_8$ cannot be 0-acyl and with the further proviso that $R_7$ and $R_8$ when taken together are oxo or a cyclic ethylene acetal; and
- $n$ is the integer 1 or 2.

The pregnane series of compounds contemplated to be within the scope of the present invention include compounds having the pregnane, 19-nor-pregnane, 9α : 10α- pregnane and D-homo-pregnane ring systems. These compounds may be illustratively represented by the following general formula:

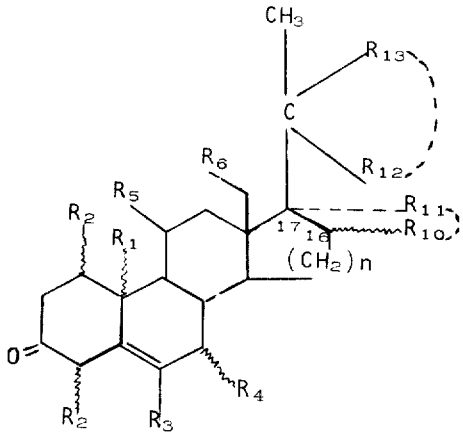

II wherein:
- $R_1$ represents a member of the group consisting of hydrogen and $(\alpha,\beta)$-methyl, with the proviso that when $R_1$ is $\alpha$-methyl the 9-hydrogen is in the beta configuration, and when $R_1$ is $\beta$-methyl, the 9-hydrogen is in the alpha configuration;
- $R_2$ is individually selected from the group consisting of hydrogen and $(\alpha,\beta)$-methyl;
- $R_3$ is hydrogen and methyl;
- $R_4$ is an $(\alpha,\beta)$-loweralkyl group having from 1 to 3 carbon atoms;
- $R_5$ is hydrogen and oxo;
- $R_6$ is hydrogen, methyl and ethyl;
- $R_{10}$ is hydrogen, methyl and methylene;
- $R_{11}$ is selected from the group consisting of hydrogen, methyl, ethyl, 2-tetrahydropyranyloxy and the group $-OR_3$, where $R_9$ represents hydrogen, a loweralkyl group having from 1 to 3 carbon atoms, and an acyl radical having from 1 to 12 carbon atoms, with the proviso that when $R_{10}$ is methylene, $R_{11}$ cannot be the 0-acyl group, and with the further proviso that $R_{10}$ and $R_{11}$ when taken together represent the $16\alpha,17\alpha$-alkylidenedioxy group

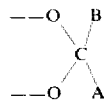

wherein A and B are loweralkyl groups having from 1 to 4 carbon atoms;
- $R_{12}$ is selected from the group consisting of hyrogen, 1-cyclopenten-1-yloxy, 1-methoxycyclohexyloxy, 2-tetrahydopyranyloxy, and the group $-OR_3$, wherein $R_9$ represents hydrogen and an acyl radical having from 1 to 12 carbon atoms, and which when taken together with $R_{13}$ is oxo; and
- $R_{13}$ is hydrogen, and which when taken together with $R_{12}$ is oxo; and
- $n$ is the integer 1 or 2

Generally speaking the compounds of this invention are crystalline solids which are insoluble in water. They are crystallizable from many inert organic solvents such as alcohol, chloroform, acetone, toluene, benzene-ether, acetone-petroleum ether or acetone-benzene.

Thie invention also describes a novel process by which these compounds can be prepared. In contrast to the behavior of alkyl Grignards, it has been discovered that diloweralkyllithiumcuprates, loweralkylcopper-trialkylphosphite complexes or loweralkylcopper-trialkylphosphine complexes, in which the loweralkyl group contains from 1 to 4 carbon atoms, unexpectedly and selectively cause 3-keto-4,6-dienic steroids to undergo a 1:6 addition resulting in the formation of the corresponding 3-keto-7($\alpha,\beta$)-loweralkyl-$\Delta^5$-steroids. Consequently, there is disclosed herein for the first time a general and readily facile method of preparing the above-identified class of 7($\alpha,\beta$)-loweralkyl-3-keto-$\Delta^5$-steroids.

Additionally, the compounds of this invention readily undergo acid or base isomerization to the corresponding $\Delta^4$-steroids. Many of these 7($\alpha,\beta$)-loweralkyl-3-keto-$\Delta^4$-steroids are well known steroids having recognized valuable biological properties including anabolic, androgenic, estrogenic and other hormonal properties, in addition to the antitumor properties of such clinically valuable compounds as 7$\alpha$,17$\alpha$-dimethyltestosterone (T. J. Cantino, E. Eisenburgh and G. S. Gordon, *Cancer*, 1966, 19, 817) and 7$\alpha$,17$\beta$-dimethyltestosterone (G. S. Gordon, A. Holden and R. M. Walter, *Clinical Research*, 1970, 18, 155). In view of the satisfactory yields obtained in both preparation of the 3-keto-7($\alpha,\beta$)loweralkyl-$\Delta^5$-steroids and their conversion to the corresponding 3-keto-7($\alpha,\beta$)-loweralkyl-$\Delta^4$-steroids, the procedures described in this invention represent, in general, a preferred route to the preparation of the 7($\alpha,\beta$)-loweralkyl3-keto-$\Delta^4$-class of steroids. These processes can be best illustrated by means of the following generalized reaction schemes:

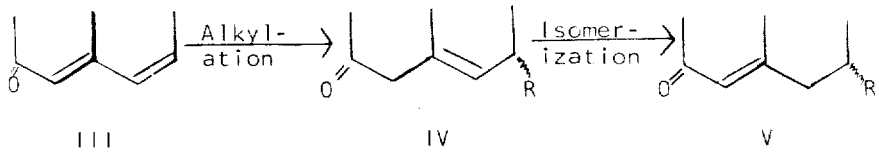

III    IV    V

DETAILED DESCRIPTION OF THE INVENTION

The novel 7($\alpha,\beta$)-loweralkyl-3-keto-$\Delta^5$-steroids are prepared by the reaction of a 3-keto-4,6-dienic steroid with a loweralkylcopperlithium reagent, a loweralkylcopper-trialkylphosphite complex or a loweralkylcopper-trialkylphosphine complex, in which the loweralkyl group contains from 1 to 3 carbon atoms, contained in an inert anhydrous organic solvent. When the addition is performed in ether or tetrahydrofuran the metallic enolate ions of the corresponding 7($\alpha,\beta$)-loweralkyl-3-hydroxy-3,5-dienic steroids is obtained from which the desired 7($\alpha,\beta$)-loweralkyl-3-keto-$\Delta^5$-steroids are generated by protonation.

When the symbol $R_1$ is hydrogen in each of formulas I and II above, the 19-nor androstane and 19-nor pregnane series of compounds are designated. Illustrative of such compounds are 17$\beta$-hydroxy-7$\alpha$-methylestra-5-en-3-one and 7$\alpha$-methyl-19-norpregn-5-en-3,20-dione.

When $R_1$ represents an $\alpha$-methyl group in each of the formulas I and II above, the hydrogen in the 9 position must be in the $\beta$-configuration. Illustrative of such compounds are 17$\beta$-hydroxy-7$\alpha$-methyl-9$\beta$,10$\alpha$-androst-5-en-3-one, 17$\beta$-hydroxy-6,7-dimethyl-9$\beta$,10$\alpha$-androst-5-en-3-one, 7$\alpha$-methyl-9$\beta$,10$\alpha$-pregn-5-ene-3,20-dione, 17$\alpha$-hydroxy-7$\alpha$-methyl-9$\beta$,10$\alpha$-pregn-5-ene-3,20-dione acetate, and 6,7-dimethyl-9$\beta$,10$\alpha$-pregn-5-ene-3,20-dione.

Conversely when $R_1$ represents a $\beta$-methyl group, the hydrogen in the 9 position must be in the $\alpha$ configuration. Illustrative of compounds which fall within this group are 17$\beta$-hydroxy-7$\alpha$-methylandrost-5-en-3-one and 7$\alpha$-methylpregn5-ene-3,20-dione.

The symbols $R_2$ and $R_3$ in formulas I and II can be either hydrogen or methyl. When $R_2$ is methyl, the methyl group may be in either the $\alpha$ or $\beta$ configuration, whereas when $R_3$ is methyl its stereochemistry is fixed by the unsaturation in the $\Delta^5$ position. Illustrative of such compounds are 17$\beta$-hydroxy-1$\alpha$,7-dimethylandrost-5-en-3-one, 17$\beta$-hydroxy-4,7-dimethylandrost-5- en-3-one, 17β-hydroxy-6,7,17α-trimethylandrost-5-en-3one, 1α,7α,16α-trimethyl-pregn-5-ene-3,20-dione, and 17α-hydroxy-6,7α-dimethylpregn-5-ene-3,20-dione, acetate.

The alkylation of 3-keto-4,6-dienic steroids in accordance with the proces hereinafter described, inserts an alkyl group in the 7-position as is indicated by the symbol $R_4$ in formulas I and II. In general the process yields a mixture of 7α and β-alkylated steroids having an alkyl group containing from 1 to 3 carbon atoms. The individual pure 7α and 7β-alkylated compounds may be separated and obtained in pure form via standard fractionation methods. Illustrative of 7-alkyl steroids prepared in this manner are 17β-hydroxy-7α-methylandrost-5-en-3-one propionate, 17β-hydroxy-7β-methylandrost-5-en-3-one propionate, 17β-hydroxy-7β-isopropylandrost-5-en-3-one, 17β-hydroxy-7α-ethylandrost-5-en-3-one, 17β-hydroxy-7β-ethylandrost-5-en-3-one, 7β-methylpregn-5-ene-3,20-dione, 7β-methylpregn-5-ene-3,20-dione, 7α-ethylpregn-5-ene-3,20-dione, and 7β-ethylpregn-5-ene-3,20-dione.

The symbol $R_5$ represents either hydrogen or an oxo group thus giving rise to the 11-oxo androstane and the 11-oxo pregnane series of compounds. Typical of such compounds are 7α-methylandrost-5-ene-3,11,17-trione, 7α-methyl-estr-5-ene-3,11,17-trione, 7α-methylpregn-5-ene-3,11,20-trione, 17α-hydroxy-6,7-dimethylpregn-5-ene-3,11,20-trione and 17α-hydroxy-7α,16α-dimethylpregn-5-ene-3,11,20-trione.

The expression $R_6$ in both the androstane and pregnane series can be hydrogen, methyl or ethyl. Typical compounds include 13-ethyl-17β-hydroxy-7-methyl-gon-5-en-3-one,acetate, and 13-ethyl-17α-hydroxy-7α-methyl-18,19-dinorpregn-5-ene-3,20-dione, acetate.

The expression $R_7$ in Formula I is intended to encompass both saturated and unsaturated aliphatic carbon groups containing from 1 to 6 carbon atoms in the alpha position. Illustrative members of this group include 17β-hydroxy-7α,17α-dimethylandrost-5-en-3-one, 17β-hydroxy-7α-methyl-17α-(1-propynyl)-estr-5-en-3-one, and 17β-hydroxy-7-methyl-17α-vinylandrost-5-en-3-one.

The symbol $R_8$ in the androstane series is in the beta configuration and represents hydrogen, the hydroxyl group and one of several alicyclic or heterocyclic ethers such as the 1-cyclopenten-1-yl, 1-methoxycyclohexyl and 2-tetrahydropyranyl ethers. Additionally, the symbol $R_8$ encompasses the expression —$OR_9$, in which the symbol $R_9$ represents an acyl radical having from 1 to 12 carbon atoms. Illustrative of such compounds are 7-methyl-17β-[(tetrahydropyranyl-2-yl)oxy]-androst-5-en-3-one, 17β-hydroxy-7αmethylandrost-5-en-3-one butyrate, and 17β-hydroxy-7αmethylandrost-5-en-3-one hydrocinnamate.

When the symbol $R_7$ is represented by one of the unsaturated members in the androstane series, such as ethinyl, the symbol $R_8$ may not be represented by the 0-acyl group, i.e., it may only be represented by hydrogen, hydroxyl or one of the enumerated alicyclic or heterocyclic ethers. Illustrative of such compounds are 17α-ethinyl-17β-hydroxy-7α-methylandrost-5-en-3-one and 17α-(1-butyryl)-17β-hydroxy-7-methylestr-5-en-3-one.

Alternatively, the symbols $R_7$ and $R_8$ in the androstane series can be considered together as representing ann oxo radical thereby forming the 3,17-androstanedione series of compounds. Illustrative of such compounds are 7α-methylandrost-5-ene-3,17-dione and 6,7-dimethylandrost-5-ene-3,17-dione.

The symbols $R_7$ and $R_8$ may also be taken together to form cyclic 17-ethylene acetals or 1,3-dioxolane derivatives of androstane. Typical of such compounds are 7α-methylandrost-5-en-3,17-dione cyclic 17-(ethylene acetal) and 7β-methylandrost-5-en-3,17-dione cyclic 17-(ethylene acetal).

In the pregnane series the 16-position may be substituted in either the alpha or beta configuration by the symbol $R_{10}$, which represents hydrogen, methyl or a methylene group. Typical of such 16-substituted compounds are 1α,7,16α-trimethylpregn-5-ene-3,20-dione, 17α-hydroxy-7,16α-dimethylpregn-5-ene-3,20-dione and 7,16α-dimethylpregn-5-ene-3,20-dione.

The symbol $R_{11}$ in the pregnane series is in the alpha configuration and represents hydrogen, methyl, ethyl, and the 2-tetrahydropyranyloxy radical. An example of such a compound is 7α-17α-dimethylpregn-5-ene-3,20-dione.

Additionally, the symbol $R_{11}$ in the pregnane series encompasses the expression —$OR_9$, wherein the symbol $R_9$ represents hydrogen, a loweralkyl group having from 1 to 3carbon atoms and an acyl radical having from 1 to 12 carbon atoms. Illustrative of such compounds are 17α-hydroxy-7α-methylpregn-5-ene-3,20-dione, acetate, 17α-hydroxy-6,7α-dimethylpregn-5-ene-3,20-dione, acetate, and 17α-hydroxy-7α-methyl-pregn-5-ene-3,20-dione, and 17α-methyloxy-7α-methylpregn-5-ene-3,20-dione.

It is to be noted, however, that when the 16-position in the pregnane series is methylene, $R_{11}$ may not be represented by the 0-acyl radical. In such circumstances, $R_{11}$ may only be hydrogen, hydroxy, methyl, ethyl, 2-tetrahydropyranyloxy and the loweralkyl ethers. Illustrative of such compounds are 17α-methoxy-7α-methyl-16-methylenepregn-5-ene-3,20-dione, and 17α-methoxy-6,7α-dimethyl-16-methylenepregn-5-ene-3,20-dione.

When the symbols $R_{10}$ and $R_{11}$ are taken together in the pregnane series, the 16α,17α-alkylidenedioxy derivatives are formed. The preferred compounds among this class of steroids are 16α,17α-dihydroxy-7α-methylpregn-5-ene-3,20-dione, cyclic acetonide with acetone and 17α-dihydroxy-6,7α-dimethylpregn-5-ene-3,20-dione, cyclic acetonide with acetone.

The symbol $R_{12}$ in the pregnane series can be hydrogen, the hydroxyl group and one of several alicyclic or heterocyclic ethers such as the 1-cyclopenten-1-yl, 1-methoxycyclohexyl and 2-tetrahydropyranyl ethers. The symbol $R_{12}$ may also represent the expression —$OR_9$, in which $R_9$ represents an acyl radical having from 1 to 12 carbon atoms. Examples of such pregnanes include 20β-hydroxy-7α-methyl9β,10α-pregn-5-en-3-one, 20β-hydroxy-7α-methyl-9β,10α-pregn-5-en-3-one, acetate and 20β-hydroxy-7α-methylpregn-5-en-3-one.

Although the C-20 position appears to include both mono and di-substituted derivatives, the present invention intends to encompass only the mono-substituted derivatives at this position. Accordingly there must always be hydrogen at the C-20 position. The exception to this general rule occurs when both the $R_{12}$ and $R_{13}$ groups are taken together to represent an oxo group giving rise to the 3,20-pregnadione derivatives as for example 7α-methylpregn-5-ene-3,20-dione.

The process of the present invention is generally applicable and may be applied to a large variety of steroidal 3-keto-4,6-dienes which are derived from such basic steroidal ring systems as androstane, 19-norandrostane, pregnane, 19-norpregnane and to modifications as represented by the 18-methyl homologues, 18-ethyl homologues and the D-homo homologues. Additionally the process of this invention may be applied to the 9β:10αstereoisomers of the aforementioned androstane and pregnane ring systems.

Thus, in the androstane series the 3-keto-7(α,β)loweralkyl-Δ⁵-androstanes are conveniently prepared in good yield by reacting a diloweralkyllithium cuprate or other organocopper reagent such as a loweralkylcopper complexed with trialkylphosphites or a loweralkylcopper complexed with trialkylphosphines in which the loweralkyl group contains from 1 to 3 carbon atoms, with a 3-keto-4,6-androstadiene substrate having the general formula

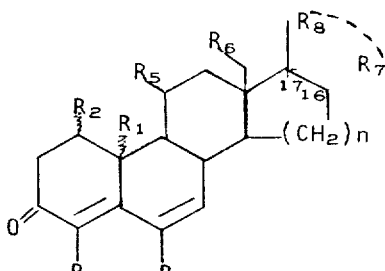

VI wherein the various R groups have the meanings hereinbefore assigned. In general the starting materials are known compounds which can be made by methods described in the literature, e.g., Zderick, et.al., *JACS*, 80, 2596 (1958) and H. J. Ringold and A. Turner, *Chem. Ind.*, 211 (1962).

Similarly, in the pregnane series, the 3-keto-7(α,β)-loweralkyl-Δ⁵-pregnanes are also conveniently prepared and in good yield by reacting a diloweralkyllithium cuprate or a loweralkylcopper complexed with trialkylphosphites or a loweralkylcopper complexed with trialkylphosphines, in which the loweralkyl group contains from 1 to 3 carbon atoms, with a 3-keto-4,6-pregnadiene having the general formula

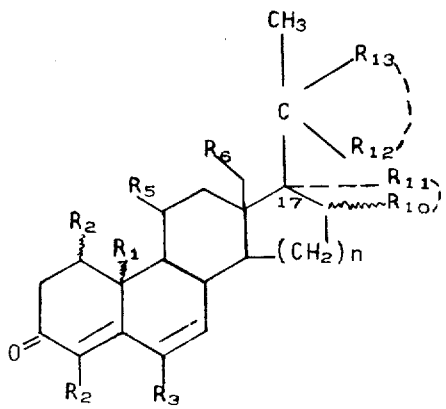

VII wherein the various R groups have the meanings hereinbefore assigned.

The organocopper reagents described and utilized in the present invention are highly specific in that they will selectively alkylate the 7-position of a 3-keto-4,6-dienic steroid via a 1,6 addition reaction. These reagents fall within three classes of organocopper compounds: diloweralkyllithium cuprates, a loweralkylcopper complexed with a trialkylphosphite, and a loweralkylcopper complexed with a trialkylphosphine, where the alkyl and loweralkyl groups contain from 1 to 3 carbon atoms. The diloweralkyllithium cuprates are the preferred reagents in carrying out the alkylation reaction with dimethyllithium cuprate representing the preferred species. However, the remaining classes of organocopper reagents will also undergo the conjugate addition reaction with the methylcopper complex of tri-n-butylphosphine being particularly effective.

The diloweralkyllithium cuprate reagents are conveniently prepared from an ethereal solution of loweralkyllithium and cuprous iodide in the molecular ratio of 2:1 under $N_2$ at a temperature of from about 0°C to about −78°C, as reported by H. O. House, W. L. Respess and G.M. Whitesides, *J. Organic Chemistry* 1966, 31, 3138. In addition to the use of diethyl ether as a solvent the reagent may be prepared in other inert anhydrous organic solvents. By the term anhydrous soluent is meant any non-aqueous solvent which is non-reactive to the organocopper reagent in which the reagent is soluble. Thus, for example, petroleum ether, tetrahydrofuran, hexane or mixtures of these solvents are suitable solvents for the organocopper reagent.

The molar proportion of the diloweralkylcopperlithium reagent necessary to insure completeness of the reaction is dependent upon the substrate employed. A minimum of 2 moles of diloweralkylcopperlithium is necessary per mole of substrate in order for the 1:6 addition reaction to take place. One additional molar ratio of diloweralkylcopperlithium is required for each other substituent of the substrate susceptible to metallation by the reagent, as for example, a hydroxyl group.

The 1:6 addition reaction can be carried out at temperatures ranging from about 10°C to about −78°C. Temperatures below ambient temperatures are preferably employed. The specific temperature will vary with the organometallic reagent employed and the nature of the steroid substrate. Thus, for example, when dimethylcopperlithium is employed, a reaction temperature of 0°C is sufficient to insure rapid addition. When diisopropylcopperlithium is employed as a reagent, a lower temperature is necessary since this particular organometallic reagent is unstable at room and elevated temperatures. A convenient temperature in which to operate is −20°C.

The organometallic reagent adds rapidly to the steroid substrate with the formation of the metallic enolate ions derived from the corresponding 7(α,β)-loweralkyl-3-hydroxy-3,5-dienic structures. The preferred method of reacting the steroid substrate is to dissolve or suspend the steroid substrate in an inert anhydrous organic solvent and add the resulting solution or suspension to the organocopper reagent dissolved in an inert anhydrous organic solvent. A reverse addition may also be utilized. The addition reaction takes place rapidly, with the reaction time being essentially controlled by the rate of addition. A preferred method of control is via the dropwise addition of a solution of the steroid substrate to a solution or suspension of the organocopper reagent. In certain instances, as for example when reacting large quantities of material, it may be desirable to stir the reaction mixture for a period of several hours thereafter.

Following the addition of the organometallic reagent the reaction mixture is quenched by the addition of a protonating agent such as a saturated solution of ammonium chloride, oxalic acid or boric acid. Generally, mixtures of 7α and 7β-loweralkyl-Δ⁵-steroids are obtained which can be separated by standard procedures such as fractional crystallization and chromatographic separation.

This reaction is highly specific in alkylating the 7-position, notwithstanding a large variety of substituents which may already be present on the steroid nucleus. Consequently this reaction is useful in alkylating steroids having other active site centers without the need for providing protecting groups of such centers. Illustrative of the various substituents which remain unaffected by the alkylating process are:

1. unconjugated carbonyl functions in the 11, 12, 15, 16, 17 and 20 positions which remain unaffected inasmuch as the organometallic reagent reacts only slowly with such carbonyl groups;
2. hydroxyl groups in the 16, 17 and 20 positions, although metallated by the reagent, are regenerated during the protonation of the reaction mixture;
3. acyloxy groups in any position remain generally unaffected.
4. ether groups exemplified by the following partial structres remain unaffected;

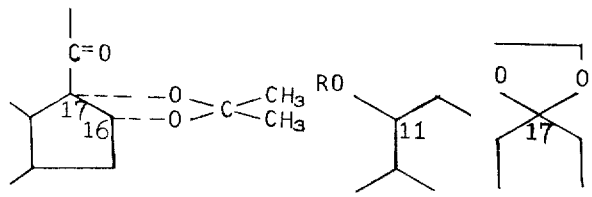

5. lower alkyl groups, particularly methyl groups, which may be present in such positions of the steroid nucleus as 1, 2, 4, 6, 11, 12, 15, 16, 17, 18, 20 and 21, and ethyl groups in such positions as 16, 17, 18 and 20, are not affected;
6. methylene and cyclomethylene groups in the 16, 17, 18 and 20 positions remain unaltered so long as the methylene groups do not contain vicinal acyloxy or oxo functions;
7. unsaturated aliphatic carbon residues containing up to 6 carbon atoms, including both double and triple bonded systems, remain unaffected providing they do not contain any acyloxy or oxo functions vicinal to their unsaturation; and
8. A spironolactone side chain in the 17-position generally remains unaffected by this reagent.

As previously indicated, 3-keto-7-(α,β)-loweralkyl-Δ⁵-steroids produced in accordance with the present invention are readily isomerized to their corresponding Δ⁴-counterparts, by treatment with an acid or base in an appropriate solvent. Thus 3-keto-7(α,β)-loweralkyl-Δ⁴-androstanes having the general formula

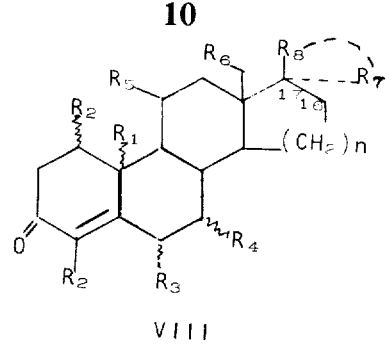

VIII wherein the various R groups have the meanings hereinbefore assigned, may be readily prepared from the corresponding 3-keto-7(α,β)-loweralkyl-Δ⁵-androstanes shown in formula I.

Similarly, 3-keton-7(α,β)-loweralkyl-Δ⁴-pregnanes having the general formula

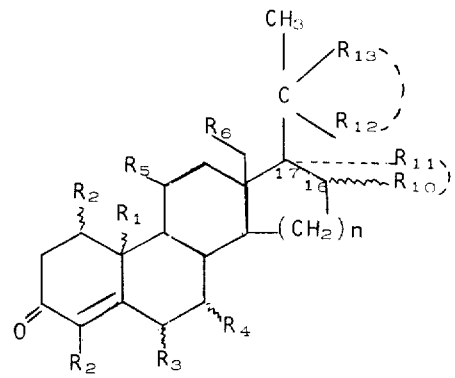

IX wherein the various R groups have the meanings previously designated, are readily prepared from their corresponding 3-keto-7(α,β)-loweralkyl-Δhu 5-pregnanes shown in formula II.

Solvents which may be suitably employed include aqueous alcohols, acetic acid, acetone, and chloroform. Aqueous ethanol and acetic acid represent the solvents of choice for the isomerization because of their ready accessibility and ease of removal. In general any readily available acid or base can be used to effect isomerization such as hydrochloric, hydrobromic, sulfuric, phosphoric and acetic acid. Examples of suitable bases include sodium hydroxide, ammonium hydroxide and sodium carbonate.

The isomerization takes place with great facility at temperatures ranging from ambient temperature to the boiling point of the solvent used. The conditions are not deemed to be critical, and for the majority of compounds isomerization appears reasonably complete in about 1 hour. The isolation of the resulting 3-keto-7(α,β)-loweralkyl-Δ⁴-steroids takes place by any of several methods known to the art. The aqueous organic solvent may be concentrated or removed completely to precipitate the 3-keto-7(α,β)-loweralkyl-Δ⁴-steroid, which may then be purified by recrystallization. Alternatively the product may be chromatographically pruified.

The 3-keto-7(α,β)-loweralkyl-androstane derivatives illustrated in formula I, wherein $R_2$, $R_3$ and $R_5$ are hydrogen, have anabolic and androgenic activity. Particularly useful are the corresponding 7α-methyl derivatives. Where $R_2$, $R_3$, $R_5$ and $R_7$ are hydrogen the compounds are useful as anti-fertility agents. These compounds affect the fertility in male and female mammals by a variety of mechanisms depending upon such parameters as species, dosage and time of administration. Thus they fall into the class of claudogenic steroids as described by V. Petrow in *J. Pharm. Pharmacol.*, 12, 704(1960). Additionally, certain claudogenic steroids show both progestational and antiprogestational activity. The presence of methyl substituents at the $C_1$, $C_2$ and $C_{11}$ positions does not qualitatively alter the biological properties of the parent compounds.

The 3-keto-7($\alpha,\beta$)-loweralkyl androstane derivatives, particularly the 7$\alpha$-methyl-17$\alpha$-substituted androstanes of formula I wherein $R_2$, $R_3$ and $R_5$ is hydrogen and $R_7$ is not hydrogen, qualitatively resemble the foregoing group of structures in their biological properties. Structures in which $R_7$ is alkynyl or alkadinyl have progestational activity also evidenced by their corresponding $C_1C_2$, $C_4$ and $C_6$ methyl derivatives. Such compounds are useful in place of known progestagens for progestagen therapy, e.g., "Progestagen Therapy" by Maxwell Roland, American Lecture Series, Publication No. 626, Charles C. Thomas, Springfield, Ill., USA for the control of fertility in male and female birds and mammals as well as for the treatment of benign prostatic hypertrophy in the male. The $C_6$ methyl derivatives can also be isomerized to the corresponding 6,7-($\alpha,\beta$)-dialkylated-$\Delta^4$-steroidal ketones which are also useful in the treatment of benign prostatic hypertrophy in the male. The 3-keto-7($\alpha,\beta$)-loweralkyl-pregnane derivatives illustrated in formula II, particularly the 7$\alpha$-methyl derivatives, in which $R_4$ is as previously defined and $R_{11}$ is hydrogen or 0-acetyl, show progestational activity.

The 7($\alpha,\beta$)-alkyl and in particular the 7$\alpha$-methyl derivatives of structure II where $R_1$, $R_6$, $R_{10}$ and $R_{11}$ are as hereinabove defined and $R_{11}$ is particularly 0Ac, are distinguished by their progestational properties. These properties are also present in the corresponding $C_1$, $C_2$, $C_4$ and $C_6$ methyl and $C_1$-$C_2$ methylene derivatives as well as in their 11-oxo derivatives. The 6,7-($\alpha,\beta$)-dimethyl-$\Delta^4$-3-steroidal ketones are particularly useful in the treatment of benign prostatic hypertrophy in the male.

The compounds of the present invention are preferably administered in unit dosage forms such as tablets, capsules, powders, granules, sterile solution or suspensions for parenteral use, and oral solutions or suspensions, and creams, lotions or ointments for topical use. Additionally the active ingredients may be administered in sublingual and intrabuccal preparations, formulations for inhalation therapy and insufflation such as sprays and aerosols, intravaginal and rectal suppositories, vaginal rings impregnated with the active ingredient, intrauterine devices and subcutaneous and intramuscular implants or depot preparations.

The dosage of the active ingredient to be administered will depend upon such factors as route of administration, age, weight and the nature of the patient's condition being treated or alleviated. A dosage of the therapeutic steroid will generally range from about 0.1 mg to about 3.0 gm per administration with repeated dosages ranging from about one to four times daily to once every three months. Illustrative dosage levels for progestagen therapy range from about 0.25 mg to about 1.5 gm per single administration per patient. In the treatment of benign prostatic hypertrophy in the male, a daily dosage of the active ingredient will generally range from about 0.25 mg to 1.5 gm per single administration per patient. Where the steroid is being administered with one or more active ingredients, the dosage is to be determined with reference to the usual dosage of such ingredients.

For oral administration either solid or liquid dosage unit forms can be prepared. In preparing solid compositions such as tablets, the principal active ingredient is mixed with conventional pharmaceutical excipients such as gelatin, starches lactose, magnesium stearate, talc, acacia, dicalcium phosphate and functionally similar material. The tablets may be laminated, coated, or otherwise compounded to provide prolonged or delayed action or to release a predetermined succession action of medication. Capsules, like tablets, are prepared by mixing the steroid with an inert pharmaceutical filler or diluent and filled in either hard gelatin capsules or machine encapsulated in soft gelatin capsules.

Liquid dosage forms for oral administration such as syrups, suspensions and elixirs may also be employed. The water soluble forms of the novel steroids of this invention can be dissolved in an aqueous vehicle together with flavoring agents and preservatives to form a syrup. An elixir utilizes a hydro-alcoholic vehicle such as ethanol with suitable sweetners and flavoring agents. Suspensions of the insoluble forms of the active steroids may be prepared in a suitable syrup vehicle with the aid of suspending agents such as acacia, tragacanth and methylcellulose.

The quantity of active ingredient contained in each dosage unit form will, of course, vary with the type of dosage unit and the nature of the condition being treated. Thus it is possible for each dosage unit to contain from about 0.1 mg to about 3.0 gm of active ingredient in addition to the non-toxic pharmaceutical excipient contained therein. A preferred range of active ingredient for an orally administered dosage form such as a tablet, capsule or liquid syrup or suspension ranges from about 50 mg to about 500 mg of active ingredient per administered dosage.

Parenteral fluid dosage forms are prepared by utilizing the active ingredient in a sterile liquid vehicle, water or saline solution being the preferred vehicle. The active ingredient can either be dissolved or suspended in the vehicle, generally depending on the form of administration and the concentration used. A water soluble form of the active ingredient can be dissolved in the vehicle and filter sterilized prior to filling a suitable vial or ampule. Alternatively the vial or ampule may be filled and subsequently sterilized. Adjuvants such as local anesthetics, preservatives and buffering agents can also be added. In order to further enhance stability, the composition may be frozen after filling and the water removed by freeze drying techniques well known in the art. Such dry lyophilized powders are then reconstituted prior to use.

Parenteral preparations including suspensions of micronized materials, oil suspensions, solutions or suspensions of the active steroid ingredient in biologically degradable materials such as polylactide are also contemplated to be within the preview of the present invention.

Parenteral suspensions are prepared in a similar manner except that the steroid is suspended in the vehicle and sterilization cannot be accomplished by filtration. Surfactants or wetting agents are conveniently employed to facilitate uniform distribution of the steroid in the vehicle. A preferred range of the active ingredient for a parenteral fluid dosage form is from about 50 mg to 3 gm per administered dose.

Topical ointments can be prepared by dispensing the active ingredient in a suitable ointment base such as petrolatum, lanolin, polyethylene glycols or mixtures thereof. Generally the steroid is finely divided by milling or grinding in a light liquid petrolatum base. Creams and lotions are prepared by dispersing the active ingredient in an oily phase and forming an emulsion therefrom.

The following preparations and examples are illustrative of the products, processes and compositions of the present invention but are not to be construed as necessarily limiting the scope thereof.

EXAMPLE I

17$\beta$-Hydroxy-7$\alpha$-methylandrost-5-en-3-one

A solution of 141 g (0.5 mole) testosterone in 750 ml dioxane was saturated with gaseous HCl and cooled to 0°C. To this solution was added over 20 min with continuous cooling a solution of 114 g (0.5 mole) 2,3-dichloro-5, 6-dicyano-1,4-benzoquinone in 750 ml dioxane saturated with gaseous HCl. The cooling bath was removed and stirring continued an additional 30 min. The reaction mixture was filtered and the solvent volatilized to give a yellow solid. Recrystallization from acetone gave 110 g of 17$\beta$-hydroxy-androsta-4,6-diene-3-one having a mp 200-202°C.

A solution of lithium dimethylcopper was prepared under nitrogen by adding 625 ml of 1.6 M (1 mole) ethereal methyllithium to a slurry of 96 g (0.5 mole) cuprous iodide in 500 ml of anhydrous ether at 0°C. This solution was stirred at 0°C for an additional 10 min follwed by the dropwise addition of a solution of 30 g (0.1) 17$\beta$-hydroxyandrosta-4,6-dien-3-one in 500 ml of anhydrous tetrahydrofuran. The reaction mixture was stirred for an additional 30 min at 0°C and then poured into 2 liters of a saturated aqueous ammonium chloride solution. Benzene was added and the mixture was filtered rapidly through diatomaceous earth. The benzene layer was washed with saturated aqueous ammonium chloride, with water, and dried (MgSO$_4$). Evaporation of the solvent gave a solid which was covered with acetone and filtered. Recrystallization from acetone gave 10 g of the desired 17$\beta$-hydroxy-7$\alpha$-methylandrost-5-en-3-one; mp 200°-216°C; uv max (EtOH) 288 nm ($\epsilon$ 82); ir (KBr) 1700 cm$^{-1}$ (C=O); nmr (CDCl$_3$) $\delta$5.37 (m, C-6 H), 0.81 (d, C-7 CH$_3$, J = 7 Hz).

Anal. Calcd for C$_{20}$H$_{30}$O$_2$: C, 79.62; H, 10.00. Found: C, 79.58; H, 10.10.

In accordance with the above procedure, but substituting for the 17$\beta$-hydroxyandrosta-4,6-diene-3-one an equivalent amount of:

Androsta-4,6-diene-3-one,
17$\beta$-hydroxy-1$\alpha$-methylandrosta-4,6-diene-3-one,
17$\beta$-hydroxy-4-methylandrosta-4,6-diene-3-one, and
17$\beta$-hydroxy-4-methylandrosta-4,6-diene-3-one-acetate.

the following compounds were respectively obtained:
7-methylandrost-5-en-3-one,
17$\beta$-hydroxy-1$\alpha$,7-dimethylandrost-5-en-3-one,
17$\beta$-hydroxy-4,7-dimethylandrost-5-en-3-one, and
17$\beta$-hydroxy-4,7-dimethylandrost-5-en-3-one, acetate.

EXAMPLE II

17$\beta$-Hydroxy-7$\alpha$-methylandrost-5-en-3-one

Methylcopper was prepared under nitrogen by adding 94 ml of 1.6 M (0.15 mole) ethereal methyllithium to an ice-cold (0°C) slurry of 28.56 g (0.15 mole) cuprous iodide in 800 ml anhydrous ether. The yellow suspension was converted to a black solution of methylcopper-trimethylphosphite complex by the addition of 55.8 g (0.45 mole) trimethylphosphite. Immediately thereafter 14.3 g (0.05 mole) of 17$\beta$-hydroxy-androsta-4,6-dien-3-one in 150 ml of anhydrous tetrahydrofuran was added dropwise and stirring continued for 45 min at 0°C. The reaction mixture was poured into 1 liter of saturated aqueous ammonium chloride. Benzene was added and the mixture rapidly filtered through diatomaceous earth. The benzene layer was washed once with saturated aqueous ammonium chloride, with water, and dried over magnesium sulfate. The solution was filtered and concentrated under a vacuum. The residue remaining was crystallized from acetone to give 2 g of the desired 17$\beta$hydroxy-7$\alpha$-methylandrost-5en-3-one: mp 195°-210°; spectral data identical with previous sample.

Anal. Calcd for C$_{20}$H$_{30}$O$_2$: C, 79.62; H, 10.00. Found: C, 79.57; H, 9.71.

EXAMPLE III

Isomerization of
17$\beta$-hydroxy-7$\alpha$-methylandrost-5-en-3-one to
17$\beta$-hydroxy-7$\alpha$-methylandrost-4-en-3-one 17$\beta$-hydroxy-7$\alpha$-methylandrost-5-en-3-one was dissolved in methanol at room temperature and HCl gas bubbled through the solution for 1 minute. The solvent was evaporated and the remaining residue recrystallized from an acetone-hexane solution to give the corresponding 17$\beta$-hydroxy-7$\alpha$-methylandrost-4-en-3-one.

17$\beta$-hydroxy-7$\alpha$-methylandrost-5-en-3-one was also isomerized under alkaline conditions. The compound was dissolved in methanol at room temperature and sodium methoxide added. The solution was stirred for 30 minutes and the resulting solution was poured into an ice-water mixture and extracted with ether. The ether extract was washed with water, dried over magnesium sulfate and concentrated. Recrystallization of the residue from acetonehexane gave 17$\beta$-hydroxy-7$\alpha$-methylandrost-4-en-3-one.

EXAMPLE IV

7$\alpha$-methyl-17$\beta$-hydroxyandrost-5-en-3-one acetate
7$\beta$-methyl-17$\beta$-hydroxyandrost-5-en-3-one acetate A solution of 50 g (0.152 mole) testosterone acetate in 500 cc dioxane was saturated with gaseous HCl and added all at once to a solution of 34.5 g (0.152 mole) of 2,3-dichloro-5,6-dicyano-1,4-benzoquinone in 500 ml dioxane saturated with gaseous HCl. The reaction mixture was stirred at room temperature for 5 minutes and filtered. Evaporation of the solvent gave a brown solid which was passed through a short alumina packed column and eluted with acetone until the colored band reached the base of the column. The combined eluant was recrystallized from acetone-hexane solution to give 40 g 17β-acetoxy-androsta4,6-dien-3-one: mp 141°–142°C.

A solution of lithium dimethylcopper was prepared under nitrogen by adding 100 ml of 1.6 M (0.160 mole) ethereal methyllithium solution to a slurry of 16.7 g (0.88 mole) cuprous iodide contained in 100 ml anhydrous ether at 0°C. The solution was maintained at 0°C for an additional 5 minutes and a solution of 10 g (0.03 mole) 17β-acetoxyandrosta-4,6-dien-3-one in 50 ml anhydrous tetrahydrofuran was added over a 1 minute period. The mixture was stirred an additional 2 minutes and poured into a saturated aqueous ammonium chloride solution. Benzene was added and the mixture rapidly filtered through diatomaceous earth. The organic layer was washed with saturated aqueous ammonium chloride, followed by a water wash, dried over magnesium sulfate and evaporated. The resulting oil was dissolved in methylene chloride and rapidly chromatographed through a silica gel column packed with methylene chloride. The material which eluted with the solvent front was recrystallized twice from hexane to give the desired 7α-methyl-17β-hydroxyandrost-5-en-3-one acetate: mp 142-155°C; uv max (EtOH) 240 nm (sh); ir (KBr) 1710–1730 cm (C=O, ester C=O); nmr (CDl$_3$) δ 5.37 (m, C-6 H), 0.81 (d, C-7 CH$_3$, J=7 Hz).

Anal. Calcd for C$_{22}$H$_{32}$O$_3$: C, 76.70; H, 9.36. Found: C, 76.59; H, 9.49.

The combined mother liquors were evaporated and the resulting oil recrystallized from pentane. This solid was then rechromatographed on a silica gel column packed in methylene chloride. The solid eluant was 7β-methyl-17β-hydroxy-androst-5-en-3-one acetate: mp 100°–107°C; uv max (EtOh) 236 nm (sh); ir (KBr) 1710 (C=o), 1725 cm$^{-1}$ (ester C=O); nmr (CDCl$_3$) δ 5.12 (broad t, C-6H), 0.98 (d, C-7 CH$_3$, J= 7 Hz).

Anal. Calcd for C$_{22}$H$_{23}$O$_3$: C, 76.70; H, 9.36. Found: C, 76.83; H, 9.46.

Following this procedure but substituting for 17β-acetoxyandrosta-4,6-dien-3-one the appropriate equivalent amounts of:

17β-hydroxyandrosta-4,6-dien-3-one, butyrate,
17β-hydroxyandrosta-4,6-dien-3-one, benzoate,
17β-hydroxy-17α-methylandrosta-4,6-dien-3-one, acetate,
17β-hydroxy-17α-methylandrosta-4,6-diene-3,11dione, acetate, and
17β-hydroxy-1α-methylandrosta-4,6-dien-3-one, acetate, the following substituted 17β-hydroxyandrost-5-end-3-ones were respectively obtained:
17β-hydroxy-7-methylandrost-5-en-3-one, butyrate,
17β-hydroxy-7-methylandrost-5-en-3-one, benzoate,
17β-hydroxy-7,17α-dimethylandrost-5-en-3-one, acetate,
17β-hydroxy-7,17α-dimethylandrost-5-ene-3,11-dione, acetate, and
17β-hydroxy-1α,7-dimethylandrost-5en-3-one, acetate.

EXAMPLE V

17β-hydroxy-7α-methylandrost-5-en-3-one propionate

17β-hydroxy-7β-methylandrost-5-en-3-one propionate

A solution of 30 g 17β-hydroxyandrosta-4,6-dien-3-one in 180 ml pyridine and 180 ml propionic anhydride were left at room temperature for 18 hours. The solution was poured into water and the solid filtered and recrystallized from acetone-hexane to give 27.6 g of 17β-hydroxy-androsta-4,6-dien-3-one propionate having a mp 134°–136°C.

A solution of lithium dimethylcopper was prepared under nitrogen by adding 262 ml of 1.6 M (0.42 mole) ethereal methyllithium to a slurry of 45.7 g (0.24 mole) cuprous iodide in 300 ml anhydrous ether at 0°C. The solution was maintained at 0.°c for an additional 15 minutes and then a solution of 27.6 g (0.081 mole) 17β-hydroxy- androsta-4,6-dien-3-one propionate in 100 ml anhydrous tetrahydrofuran was added over a period of 2 minutes. The mixture was stirred for an additional one minute and poured into a saturated aqueous ammonium chloride solution. Benzene was added and the mixture rapidly filtered through diatomaceous earth. The organic layer was washed with a saturated aqueous ammonium chloride solution, then with water, dried over magnesium sulfate and evaporated to dryness. The resulting oil was dissolved in methylene chloride and rapidly chromatographed through a silica gel column packed in methylene chloride. The material which eluted with the solvent front was recrystallized from hexane to give the desired 17β-hydroxy-7β-methylandrost-5-en-3-one propionate: mp 144°–148°C; uv max (Et OH) 242 nm (sh); ir (KBr) 1730 (ester C=O, 1710 cm$^{-1}$ (C=O); nmr (CDCl$_3$) δ 5.1 (broad t, C-6 H), 0.97 (d, C-7 CH$_3$, J = 7 Hz).

Anal. Calcd for C$_{23}$H$_{34}$O$_3$: C, 77.05; H, 9.55. Found: C, 77.14; H, 9.61.

The mother liquor was evaporated and the resulting oil rechromatographed on a silica gel column packed in methylene chloride. The semi-solid mass was layered with pentane and filtered. The pentane solution was concentrated and on standing 17β-hydroxy-7α-methylandrost-5-en-3-one propionate precipitated: mp 82°–85°C; uv max (EtOH) 244 nm (sh); ir (KBr) 1725 (ester C=O), 1710 cm$^{-1}$ (C=O); nmr (CDCl$_3$) δ 5.37 (m, C-6 H) , 0.81 (d, C-7 CH$_3$, J=7 Hz).

Anal. Calcd for C$_{23}$H$_{34}$O$_3$: C, 77.05; H, 9.55. Found: C, 77.18; H, 9.64.

Following the above procedure of Example V and substituting for 17β-hydroxyandrosta-4,6-dien-3-one propionate an equivalent amount of: 17β-hydroxy-17α-methylandrosta-4,6-dien-3-one, propionate, 17β-hydroxyandrosta-4,6-dien-3-one, phenoxyacetate
17β-hydroxyandrosta-4,6-dien-3-one, hydrocinnamate and
17β-hydroxy-1α-methylandrosta-4,6-dien-3-one, propionate, the following compounds were respectively obtained:
17β-hydroxy-7,17α-dimethylandrost-5-en-3-one, propionate,
17βhydroxy-7-methylandrost-5-en-3-one, phenoxyacetate,
17β-hydroxy-7-methylandrost-5-en-3-one, hydrocinnamate, and
17β-hydroxy-1α,7-dimethylandrost-5-en-3-one, propionate.

EXAMPLE VI

7α-methylandrost-5-en-3,17-dione

A solution of 22.7 g (0.1 mole) 2,3-dichloro-5,6-dicyano-1,4-benzoquinone in 250 ml of dioxane saturated with gaseous HCl was added all at once to a solution of 28.6 g (0.1 mole) of androstenedione in a solution of 500 ml of dioxane saturated with gaseous HCl. The reaction mixture was stirred for 30 minutes at room temperature and filtered. The dioxane solution was evaporated and the residue recrystallized from acetone-hexane to give 28 g of androsta-4,6-dien-3,17-dione having a mp of 163°–⅓°C.

A solution of lithium dimethylcopper was prepared under nitrogen by adding 156 ml of 1.6 M (0.25 mole) ethereal methyllithium to a slurry of 24 g (0.126 mole) cuprous iodide contained in 150 ml of anhydrous ether at 0°C. A solution of 14.2 g (0.05 mole) of androsta-4,6-dien-3,17-dione in 150 ml anhydrous tetrahydrofuran was added and the reaction mixture stirred at 0°C for 3 minutes. The mixture was poured into 1.5 liters of a saturated aqueous ammonium chloride solution, diluted with benzene and rapidly filtered through diatomaceous earth. The benzene layer was washed with a saturated solution of aqueous ammonium chloride, then water, dried with $MgSO_4$, and concentrated to an oil. The oil was dissolved in methylene chloride and chromatographed on a silica gel column packed in methylene chloride. The methylene chloride eluants were combined and recrystallized three times from acetone, once from methylene chloride, and finally triturated with ether. The ether mixture was filtered and concentrated to give the desired 7α-methylandrost-5-en-3,17-dione: mp 170°–185°C, uv max (EtOH) 242 (sh) nm, 290 nm (ε 115); ir (KBr) 1710, 1695 $cm^{-1}$ (C=O); nmr ($CDCl_3$) δ 5.4 (m, C-6 H), 0.85 (d, C-7 $CH_3$, J = 7 Hz).

Anal. Calcd for $C_{20}H_{28}O_2$: C, 79.96; H, 9.39. Found: C, 79.89, 79.69; H, 9.54, 9.38.

EXAMPLE VII

17β-hydroxy-7α,17α-dimethylandrost-5-en-3-one

A solution of 12 g (0.05 mole) of 2,3-dichloro-5,6-dicyano-1,4-benzoquinone in 200 ml dioxane saturated with gaseous HCl was added all at once to 0.C solution of 15 g (0.05 mole) of 17α-methly testosterone in 500 ml of dioxane saturated with gaseous HCl. The reaction mixture was stirred for 30 minutes at room temperature and filtered. The dioxane was removed under vacuum and the residue recrystallized twice from acetone-hexane to give 10 g of 17β-hydroxy-7α-methylandrosta-4,6-dien-3-one: mp 190°–195°C.

A solution of lithium dimethylcopper was prepared under nitrogen by adding 188 ml of 1.6 M (0.3 mole) ethereal methyllithium to a slurry of 28.5 g (0.15 mole) of cuprous iodide in 200 ml of anhydrous ether at 0°C. A solution of 9.0 g (0.03 mole) of 17β-hydroxy-17α-methylandrosta-4,6-dien-3-one in 200 ml of anhydrous tetrahydrofuran was added dropwise. The reaction mixture was stirred at 0°C for 30 minutes and poured into 750 ml of a saturated aqueous ammonium chloride solution. Benzene was added and the mixture was filtered through a bed of diatomaceous earth. The benzene layer was washed with a saturated aqueous ammonium chloride solution, with water, dried over $MgSO_4$ and evaporated under vacuum. The resulting oil was recrystallized three times from ether to give the desired 17β-hydroxy-7α,17α-dimethylandrost-5-en-3-one: mp 159°–179°C, uv max (EtOH) 235 nm (sh); ir (KBr) 1700 $cm^{-1}$ (C=O); nmr ($CDCl_3$) δ 5.36 (m, C-6 H), 0.80 (d, C-7 $CH_3$, J = 7 Hz).

Anal. Calcd for $C_{21}H_{32}O_2$: C, 79.70; H, 10.19. Found: C, 79.70; H, 10.23.

EXAMPLE VIII

17α-ethinyl-17β-hydroxy-7-methylandrost-5-en-3-one

A solution of 50 g (0.16 mole) of 17α-ethinyl testosterone in 500 ml dioxane was saturated with gaseous HCl and added to a solution of 36 g (0.16) of 2,3-dichloro-5,6-dicyano-1,4-benzoquinone in 250 ml of a dioxane solution saturated with gaseous HCl. The reaction mixture was stirred for 30 minutes at room temperature and filtered. The filtrate was concentrated to 250 ml, chilled, and filtered to give 42 g of 17α-ethinyl-17β-hydroxyandrosta-4,6-dien-3-one: mp 259°–263°C.

A solution of lithium dimethylcopper was prepared under nitrogen by adding 406 ml of 1.6 M (0.65 mole) ethereal methyllithium to a slurry of 64 g (0.335 mole) of cuprous iodide suspended in 300 ml of anhydrous ether at 0°C. To the solution was added a solution of 20 g (0.065 mole) of 17α-ethinyl-17β-hydroxyandrosta-4,6-dien-3-one in 750 ml of anhydrous tetrahydrofuran over a 20 minute period. The reaction mixture was stirred for an additional 30 minutes at 0°C and then poured into 1 liter of a saturated aqueous ammonium chloride solution. Benzene was added and the mixture filtered through diatomaceous earth. The organic layer was washed with a saturated solution of aqueous ammonium chloride, dried over sodium sulfate and evaporated to dryness. The dark residue was dissolved in methylene chloride and rapidly chromatographed through a 400 g silica gel column packed in methylene chloride. The eluant was recrystallized twice from acetone-hexane mixture to give the desired 17α-ethinyl-17β-hydroxy-7-methylandrost-5-en-3-one: mp 170°–172°C; uv max (EtOH) 240 nm (sh); ir ($CHCl_3$) 1700 $cm^{-1}$ (C=O) nmr ($CDCl_3$) δ 5.37 (m, C-6 H), 5.1 (m, C-6 H), 0.98 (d, C-7 β$CH_3$, J = 7 Hz), 0,83 (d, C-7 α$CH_3$, J = 7 Hz).

Anal. Calcd for $C_{22}H_{30}O_2$: C, 80.94; H, 9.26. Found: C, 80.83; H, 9.27. Following this procedure but substituting for the 17α-ethinyl-17-hydroxyandrosta-4,6-dien-3-one equivalent amounts of: 17β-hydroxy-17α-androsta-4,6-dien-3-one and 17β-hydroxy-17α-vinylandrosta-4,6-dien-3-one, resulted in the formation of: 17β-hydroxy-17α-[1-(3-hydroxypropynyl)]-7-methylandrost-5-en-3-one and 17β-hydroxy-7-methyl-17α-vinylandrost-5-en-3-one, respectively.

EXAMPLE IX

7α-methylandrost-5-en-3,17-dione cyclic 17-(ethylene acetal)

7β-methylandrost-5-en-3,17-dione cyclic 17-(ethylene acetal)

27 g of pyridinium hydrobromide perbromide was added in small portions to a solution of 20 g of 3β-hydroxy-androst-5-ene-17-one cyclic ethylene ketal in 250 ml pyridine at 0°C. The reaction mixture was maintained at 0°C for 3 hours and then stirred at room temperature for an additional 2 hours. After recooling to 0°C a solution of 15 g of chromium trioxide in 150 ml pyridine was added slowly. Stirring was continued for an additional 3 hours at 0°C. The reaction mixture was stirred at room temperature overnight, poured into water and extracted with benzene. The benzene extract was washed with water, dried over $MgSO_4$ and evaporated. The residue was dissolved in 360 ml of dimethylformamide and 36 g of lithium chloride and 36 g of lithium carbonate were added. This reaction mixture was heated on a steam bath for 30 minutes, allowed to stand at room temperature for an additional 2 hours, filtered, concentrated to 100 ml, diluted with water, and extracted with methylene chloride. The methylene chloride extract was dissolved in benzene, placed on an alumina column packed in benzene, and eluted with benzene. Recrystallization of the eluant from an ether-pentane mixture yielded 12 g of androsta-4,6-dien-3,17-dione, cyclic 17-(ethylene acetal) having a mp 152°–157°C.

A solution of lithium dimethylcopper was prepared under nitrogen by adding 188 ml of 1.6 M (0.3 moles) of an ethereal methyllithium solution to a slurry of 29 g (0.15 mole) of cuprous iodide suspended in 200 ml anhydrous ether at 0°C. The solution was stirred an additional 10 minutes at 0°C and a solution of 10.9 (0.033 mole) of androst-4,6-dien-3,17-dione cyclic 17-(ethylene acetal) in 150 ml of anhydrous tetrahydrofuran was added over a period of 15 minutes with continuous stirring at a temperature of 0°C. Stirring was continued for an additional 30 minutes at 0°C, the mixture poured into 1 liter of a saturated aqueous ammonium chloride solution, benzene added and the resultant mixture rapidly filtered through diatomaceous earth. The organic layer was washed with a saturated aqueous ammonium chloride solution, washed with water, dried over $MgSO_4$, and concentrated to an oil. The oil was dissolved in methylene chloride and rapidly chromatographed on a silica gel column packed in methylene chloride. The methylene chloride containing eluant was crystallized four times from ether-pentane solution to give the desired 7α-methyl-an-drost-5-en-3,17-dione, cyclic 17-(ethylene acetal): mp 130°–141°C, uv max (EtOH) 240 nm (sh); ir (KBr) 1700 cm$^{-1}$ (C=O); nmr (CDCl$_3$) δ 5.39 (m, C-6 H), 0.83 (d, C-7 CH$_3$, J = 7 Hz).

Anal. Calcd for $C_{22}H_{32}O_3$: C, 76.70; H, 9.36. Found: C, 76.67; H, 9.42.

The combined mother liquors were treated with etherpentane solutions. The solid was filtered and the mother liquor concentrated to an oil. This oil was recrystallized twice from hexane to give the desired 7β-methylandrost-5-en-3,17-dione, cyclic 17-(ethylene acetal): mp 106°–116°C, uv max (EtOH) 237 nm (sh); ir (KBr) 1700 cm$^{-1}$ (C=O); nmr (CDCl$_3$) δ 5.12 (broad t, C-6 H), 0.98 (d, C-7 CH$_3$, J = 7 Hz).

Anal. Calcd for $C_{22}H_{32}O_3$: C, 76.70; H, 9.36. Found: C, 76.44; H, 9.14.

Following this procedure but substituting the appropriate amounts of:

17 β-[(1-methoxycyclohexl)oxy]-androsta-4,6-dien-3-one, 17η-(1-cyclopenten-1-yloxy)-androsta-4,6-dien-3-one, and 17β-[(tetrahydropyran-2-yl)oxy]-androsta-4,6-dien-3-one for androst-4,6-dien-3,17-dione cyclic 17-(ethylene acetal) resulted in the formation of:

17β-[(1-methoxycyclohexyl)oxy]-7-methylandrost-5-en-3-one,
17β-(1-cyclopenten-1-yloxy)-7-methylandrost-5-en-3-one, and
7-methyl-17β-[(tetrahydropyran-2-yl)oxy]-androst-5-en-3-one, respectively.

EXAMPLE X

17β-hydroxy-6,7α-dimethylandrost-5-en-3-one acetate

A solution of 16.7 g (0.0489 mole) of 17β-acetoxy-6-methyleneandrost-4-en-3-one and 8.2 g sodium acetate in 330 ml of absolute ethanol was stirred and refluxed overnight with 1.0 g of 10% palladium on charcoal. The mixture was filtered through diatomaceous earth, the filtrate concentrated, and diluted with water, and extracted with ether. The ether solution was dried over $MgSO_4$ and removed under vacuum. Recrystallization of the residue methanol gave 14.1 g of 17β-acetoxy-6-methylandrosta-4,6-dien-3-one: mp 171°–172.5°C.

A solution of lithium dimethylcopper was prepared under nitrogen by adding 55 ml of 1.6 M (.088 mole) ethereal methyllithium solution to a slurry of 9.45 g (0.0495 mole) of cuprous iodide in 120 ml of anhydrous ether at 0°C. The resulting solution was stirred at 0°C for an additional 20 minutes, followed by the addition of a solution of 5.0 g (0.0146 mole) of 17β-acetoxy-6-methyl-androsta-4,6-dien-3-one in 65 ml anhydrous tetrahydrofuran. Stirring was continued for 70 minutes at 0°C. The reaction mixture was poured into a saturated aqueous ammonium chloride solution with vigorous stirring. Benzene was added and the mixture was filtered through diatomaceous earth. The organic layer was washed with a saturated aqueous ammonium chloride solution followed by a water wash, dried over $MgSO_4$, treated with charcoal, filtered and concentrated to a pale yellow oil. The oil was dissolved in methylene chloride and chromatographed on 200 g kieselguhr prepared in methylene chloride. One hundred ml fractions of the eluate were collected and fractions 12–22 were combined and concentrated to yield a colorless oil. Upon recrystallization from hexane the desired 17β-hydroxy-6,7α-dimethylandrost-5-en-3-one acetate was obtained: mp 120°–122°C, max (EtOH) 288 nm (ε 195); ir (KBr) 1720 (ester C=O), 1695 cm$^{-1}$ (C=O); nmr (CDCl$_3$), δ1.63 (S, C-6 CH$_3$) 0.87 (d, C-7 CH$_3$, J = 6.3 Hz).

Anal. Calcd for $C_{23}H_{34}O_3$: C, 77.05; H, 9.56. Found: C, 77.02; H, 9.52.

Following the above procedure an equivalent amount of the following 6-methyl-androsta-4,6-dien-3-ones was substituted for the 17β-acetoxy-6-methylandrosta-4,6-dien-3-one:

17β-hydroxy-6,17α-dimethylandrosta-4,6-dien-3-one,
17β-hydroxy-6,17α-dimethylandrosta-4,6-dien-3-one, acetate,
6-methylandrosta-4,6-dien-3,17-dione,
17β-hydroxy-2α,6-dimethylandrosta-4,6-dien-3-one,
6-methyl-17β-[(tetrahydropyran-2-yl)oxy]-androsta-4,6-dien-3-one,
17β-hydroxy-6-methyl-17α-(1-propynyl)androsta-4,6-dien-3-one, and
D-homo-17aβ-hydroxy-6,17aα-dimethylandrosta-4,6-dien-3-one.

The following 7-methylated steroids were obtained:
17β-hydroxy-6,7,17α-trimethylandrost-5-en-3-one, 17β-hydroxy-6,7,17α-trimethylandrost-5-en-3-one, acetate,
6,7-dimethylandrost-5-ene-3,17-dione,
17β-hydroxy-2α,6,7-trimethylandrost-5-en-3-one,
6,7-dimethyl-17β-[(tetrahydropyran-2-yl)oxy]-androst-5-en-3-one,
17β-hydroxy-6,7-diemthyl-17α-(1-propynyl)androst-5-en-3-one, and D-homo-17aβ-hydroxy-6,7,17aα-trimethylandrost-5-en-3-one.

EXAMPLE XI

17β-hydroxy-7α-methylestr-5-en-3-one

A solution of 25 g (0.07 mole) of 3,17β-diacetoxy-3,5-estradiene in 25 ml of pyridine and 250 ml of acetic acid was cooled to -5°C. To this solution was added slowly with stirring 24 g (0.075 mole) of pyridinium hydrobromide perbromide. When the color had disappeared the reaction mixture was poured onto a mixture of ice and water and extracted with ether. The ether extract was quickly dried and was added under a steady stream of nitrogen to a refluxing mixture of 25 g of lithium bromide and 25 g of lithium carbonate contained in 400 ml of dimethylformamide. Care was taken during the ether addition to maintain the temperature of the reaction mixture at 100°C. After the ether had been completely removed the mixture was heated to reflux for one additional hour, poured onto a mixture of ice and water, and extracted with ethyl acetate. The organic extract was washed with water, dried over $MgSO_4$ and the solvent removed under vacuum. This crude oil was dissolved in 250 ml of 10% methanolic potassium hydroxide and the solution refluxed for 45 minutes. The solution was concentrated, diluted with water, and extracted with ether. The resulting solid was recrystallized from an acetone-hexane solution to give 12 g of 17β-hydroxyestr-4,6-diene-3-one having a mp of 183°–185°C.

A solution of lithium dimethylcopper was prepared under nitrogen by adding 158 ml of 1.6 M (0.252 mole) ethereal methyllithium solution to a slurry of 26.7 g (0.139 mole) of cuprous iodide in 500 ml anhydrous ether at 0°C. The solution was stirred at 0°C an additional 5 minutes and then a solution of 11.3 g (0.042 mole) of 17β-hydroxyestr-4,6-diene-3-one in 100 ml anhydrous tetrahydrofuran was added over a 5 minute period. The reaction mixture was stirred an additional 5 minutes at 0°C and poured into a saturated aqueous ammonium chloride solution. Benzene was added and the resulting mixture was rapidly filtered through diatomaceous earth. The organic layer was washed with a saturated aqueous ammonium chloride solution, with water, dried over $MgSO_4$, and evaporated. The resulting oil was dissolved in methylene chloride and chromatographed rapidly on a silica gel column packed in methylene chloride. The desired material eluted with the methylene chloride solvent front and was twice recrystallized from an acetone-hexane solution to give desired 17β-hydroxy-7α-methylestr-5-ene-3-one: mp 98–101° c, uv max (EtOH) none; ir (KBr) 1710 $cm^{-1}$ (C=O); nmr ($CDCl_3$) δ 5.51 (m, C-6 H), 0.80 (d, C-7 $CH_3$, J = 7 Hz).

Anal. Calcd for $C_{19}H_{28}O_2$c, 79.12; H, 9.78. Found: C, 78.72, 78.57; H, 9.98, 9.92.

Following the above procedure the appropriate equivalent amounts of the following compounds were substituted in lieu of the 17β-hydroxy-estr-4,6-diene-3-one:

estra-4,6-diene-3,17-dione.
17α-(1-butynyl)-17β-hydroxy-estra-4,6-diene-3-one,
17β-hydroxy-17α-(1-propynyl)-estra-4,6,-diene-3-one,
17β-hydroxyestra-4,6-diene-3-one, acetate,
17β-[(tetrahydropyran-2-yl)oxyl]-estra-4,6-diene-3-one,
17β-hydroxy-17α-propylestra-4,6-diene-3-one, acetate,
17α-butyl-17β-hydroxyestra-4,6-diene-3-one,
17α-butyl-17β-hydroxyestra-4,6-diene-3-one, acetate
17α-butyl-17β-hydroxyestra-4,6-diene-3,11-dione, acetate,
estra-4,6-diene-3,11,17-trione,
6-methyl-17β-[(tetrahydropyran-2-yl)oxy]-estra-4,6-diene-3-one and
13-ethyl-17β-hydroxygona-4,6-diene-3-one, acetate.

The following compounds were respectively obtained:
7-methylestr-5-ene-3,17-dione,
17α-(1-butynyl)-17β-hydroxy-7-methylestr-5-ene-3-one,
17β-hydroxy-7-methyl-17α-(1-propynyl)-estr-5-ene-3-one,
17β-hydroxy-7-methlestr-5-ene-3-one, acetate,
7-methyl-17β-[(tetrahydropyran-2-yl)oxy]-estr-5-ene-3-one, 17β-hydroxy-7-methyl-17α-propylestr-5-ene-3-one, acetate,
17α-butyl-17β-hydroxy-7-methylestr-5-ene-3-one,
17α-butyl-17β-hydroxy-7-methylestr-5-ene-3-one, acetate,
17α-butyl-17β-hydroxy-7-methylestra-5-ene-3,11-dione, acetate,
7-methylestr-5-ene-3,11,17-trione,
6,7-diemthyl-17β-[(tetrahydropyran-2-yl)oxy]estr-5-ene-3-one, and
13-ethyl-17β-hydroxy-7-methylgon-5-ene 3-one, acetate.

EXAMPLE XII

17β-hydroxy-7β-isopropylandrost-4-en-3-one

A solution of lithium diisopropylcopper was prepared under nitrogen by adding 250 ml of 2 M (0.5 mole) isopropyllithium in pentane to a slurry of 48.0 g (0.25 mole) of cuprous iodide suspended in 250 ml of anhydrous ether at −20°C. A solution of 30 g (0.1 mole) 17β-hydroxyandrosta-4,6-diene-3-one in 500 ml of anhydrous tetrahydrofuran was added dropwise. The reaction mixture was stirred for an additional 30 minutes at −20°C and poured into 2 liters of 3 M HCl. Benzene was added and the mixture filtered through diatomaceous earth. The benzene layer was separated, washed with water, dried over magnesium sulfate and concentrated to dryness. The residue was dissolved in methylene chloride and chromatographed on a silica gel column packed in methylene chloride. The methylene chloride was concentrated to an oil which was crystallized 3 times from an acetone-hexane mixture to give 17β-hydroxy-7β-isopropylandrost-4-en-3-one: mp 153°–156° ; uv max (EtOH) 245 nm (ε 15,300); ir (KBr) 1670 $cm^{-1}$ (C=O); nmr ($CDCl_3$) δ 5.75 (broad s, C-4 H).

Anal. Calcd for $C_{22}H_{34}O_2$: C, 79.96; H, 10.37. Found: C, 79.86; H, 10.61.

EXAMPLE XIII

7α-methylandrost-5-ene-3,11,17-trione

7β-methylandrost-5-ene-3,11,17-trione

A solution of 30 g (0.1 mole) androst-4-ene-3,11,17-trione dissolved in 600 ml of dioxane was saturated with gaseous HCl. To this solution was added a solution of 22.7 g (0.1 mole) of 2,3-dichloro-5,6-dicyano-1,4-benzoquinone contained in 300 ml dioxane also saturated with gaseous HCl. The reaction mixture was stirred for 30 minutes and filtered. The solvent was removed under vacuum and the residue recrystallized from ethylacetate to give 27 g of androst-4,6-diene-3,11,17-trione: mp 252°–255°C.

A solution of lithium dimethylcopper was prepared under nitrogen by the addition of 250 ml of 1.6 M (0.4 mole) of ethereal methyllithium solution to a slurry of 38 g (0.2 mole) cuprous iodide in 200 ml of anhydrous ether at 0°C. The solution was stirred at 0°C for an additional 10 minutes and a solution of 14.9 (0.05 mole) of androsta-4,6-diene-3,11,17-trione in 400 ml of anhydrous tetrahydrofuran was added via dropwise addition. The reaction mixture was stirred for an additional 5 minutes at 0°C and poured into 1 liter of a saturated aqueous ammonium chloride solution. Benzene was added and the mixture rapidly filtered through diatomaceous earth. The benzene layer was separated, washed with a saturated aqueous ammonium chloride solution, washed with water, dried over magnesium sulfate and evaporated to dryness. The residue was layered with 75 ml acetone and the solid filtered. Two recrystallizations from acetone gave 7α-methylandrost-5-ene-3,11,17-trione: mp 198°–212°C. uv max (EtOH) 240 nm (sh); ir (KBr) 1720, 1710–1680 cm$^{-1}$ (C=O); nmr (CDCl$_3$) δ 5.42 (m, C-6 H), 0.98 (d, C-7 CH$_3$, J = 12 Hz).

Anal. Calcd for C$_{20}$H$_{26}$O$_3$: C, 76.40; H, 8.34. Found: C, 76.67; H, 8.55.

The first acetone mother liquor was evaporated and the residue chromatographed on a silica gel column packed in methylene chloride. The methylene chloride eluant was recrystallized from acetone-hexane to give 7α-methylandrost-5-ene-3,11,17-trione: mp 152°–166°; uv max (EtOH) 241 nm (δ 1270); ir (KBr) 1720, 1710–1680 cm$^{-1}$ (C=O); nmr (CDCl$_3$) δ 5.15 (broad t, C-6 H), 1.13 (d, C-7 CH$_3$, J = 12 Hz).

Anal. Calcd for C$_{20}$H$_{26}$O$_3$; C, 76.40; H, 8.34. Found: C, 76.45; H, 8.48.

EXAMPLE XIV

7α-methyl-5-pregnen-3,20-dione

A solution of 31.4 g (0.1 mole) of progesterone in 500 cc of dioxane was saturated with gaseous HCl and added all at once to a solution of 22.7 g (0.1 mole) of 2,3-dichloro-5,6-dicyano-1,4-benzoquinone in 500 ml dioxane saturated with gaseous HCl. The reaction mixture was stirred at room temperature for 15 minutes and filtered. Evaporation of the dioxane left a yellow oil which upon recrystallization from an acetone-hexane solution yielded 20 g of pregna-4,6-diene-3,20-dione, having a mp of 115°–132°C. A second recrystallization increased the mp to 128°–130°C.

A solution of lithium dimethylcopper was prepared by the addition of 320 ml of 1.6 M (0.512 mole) ethereal methyllithium under nitrogen at 0°C to a slurry of 51 g (0.268 mole) of cuprous iodide in 500 ml of anhydrous ether. The solution was stirred at 0°C for an additional 5 minutes and a solution of 20 g (0.064 mole) of pregna-4,6-diene-3,20-dione in 125 ml anhydrous tetrahydrofuran was added over a period of 5 minutes. The mixture was stirred an additional 5 minutes and poured into 500 ml of a saturated aqueous ammonium chloride solution. Benzene was added and the mixture was rapidly filtered through diatomaceous earth. The organic layer was washed with a saturated aqueous ammonium chloride solution, washed with water, dried over MgSO$_4$, and evaporated to dryness. The resulting solid was triturated with hexane and collected by filtration. Three recrystallizations from hexane gave the desired 7α-methyl-5-pregnen-3,20-dione: mp 138°–155°C; uv max (EtOH) 238 nm (sh); ir (KBr) 1685–1710 cm$^{-1}$ (C=O) nmr (CDCl$_3$) δ 5.37 (m, C-6 H), 0.81 (d, C-7 CH$_3$, J = 6.5 Hz).

Anal. Calcd for C$_{22}$H$_{32}$O$_2$: C, 80.44; H, 9.82. Found: C, 80.38; H, 9.73.

Following the above procedure an equivalent amount of the following compounds was substituted in lieu of the pregna-4,6-diene-3,20-dione:

17α-hydroxypregna-4,6-diene-3,20-dione,
17α-methoxypregna-4,6-diene-3,20-dione,
1α,16α-dimethylpregna-4,6-diene-3,20-dione,
17α-hydroxy-1α-methylpregna-4,6-diene-3,20-dione,
17α-hydroxy-16α-methylpregna-4,6-diene-3,20-dione,
17α-hydroxy-6,16β-dimethylpregna-4,6-diene-3,11,20-trione,
pregna-4,6-diene-3,11,20-trione,
17α-hydroxy-16-methylpregna-4,6-diene-3,11,20-trione,
17α-hydroxy-6-methylpregna-4,6-diene-3,11,20-trione,
20β-hydroxypregna-4,6-diene-3-one,
19-norpregna-4,6-diene-3,20-dione,
13-ethyl-17α-hydroxy-18,19-dinorpregna-4,6-diene-3,20-dione, acetate and
13-ethyl-17α-hydroxy-6-methyl-18-19-dinorpregna-4,6-diene-3,20-dione, acetate.

The following compounds were respectively obtained:

17α-hydroxy-7-methylpregn-5-ene-3,20-dione,
17α-methoxy-7-methylpregn-5-ene-3,20-dione,
1α,7,16α-trimethylpregn-5-ene-3,20-dione,
17α-hydroxy-1α,7-dimethylpregn-5-ene-3,20-dione,
17α-hydroxy-7,16α-dimethylpregn-5-ene-3,20-dione,
17α-hydroxy-6,7,16β-trimethylpregn-5-ene-3,11,20-trione,
7-methylpregn-5-ene-3,11,20-trione,
17α-hydroxy-7,16-dimethylpregn-5-ene-3,11,20-trione,
17α-hydroxy-6,7-dimethylpregn-5-ene-3,11,20-trione,
20β-hydroxy-7-methylpregn-5-ene-3-one,
7-methyl-19-norpregn-5-ene-3,20-dione,
13-ethyl-17α-hydroxy-7-methyl-18-19-dinorpregn-5-ene-3,20-dione, acetate and
13-ethyl-17α-hydroxy-6,7-dimethyl-18,19-dinorpregn-5-ene-3,20-dione, acetate.

EXAMPLE XV

17α-acetoxy-6,7α-dimethyl-5-pregnen-3,20-dione

A solution of lithium dimethylcopper was prepared by the addition of 260 ml of 1.6 M (0.208 mole) ethereal methyllithium under nitrogen to a slurry of 41.6 g (0.109 moles) of cuprous iodide suspended in 600 ml of anhydrous ether at 0°C. The mixture was stirred at 0°C for 10 minutes after which a solution of 20.0 g (0.026 mole) of 17α-acetoxy-6-methyl-pregna-4,6-diene-3,20-dione in 100 cc anhydrous tetrahydrofuran was added over a 5-minute period. After stirring at 0°C for an additional 5 minutes, the reaction mixture was poured into a saturated aqueous ammonium chloride solution. Benzene was added and the mixture rapidly filtered through diatomaceous earth. The organic layer was washed with a saturated aqueous ammonium chloride solution, washed with water, dried over $MgSO_4$ and concentrated under vacuum. The residual oil was dissolved in methylene chloride and rapidly filtered through a silica gel column packed in methylene chloride. The first eluant was recrystallized from an acetone-hexane mixture to give 17α-acetoxy-6,7α-dimethyl-5-pregnene-3,20-dione; mp 140°–160°C; uv max (EtOH) 235 nm (ε 2020); ir (KBr) 1700 (C=O) 1720 (C=O) 1725 cm$^{-1}$ (ester C=O); nmr (CDCl$_3$), δ 1.65 (s, C-6 CH$_3$), 0.91 (d, C-7 CH$_3$, J = 6.5 Hz).

Anal. Calcd for $C_{25}H_{36}O_4$: C, 74.96; H, 9.06. Found: C, 74.17, 74.24; H, 9.05, 9.04.

In accordance with the foregoing procedure an equivalent amount of the following compounds was substituted in lieu of the 17α-acetoxy-6-methyl-pregna-4,6-diene-3,20-dione:

- 6-methylpregna-4,6-diene-3,20-dione,
- 17α-hydroxy-6-methylpregna-4,6-diene-3,20-dione,
- 6,17α-dimethylpregna-4,6-diene-3,20-dione,
- 16α,17α-dihydroxypregna-4,6-diene-3,20-dione cyclic acetal with acetone,
- 16α,17α-dihydroxy-6-methylpregna-4,6-diene-3,20-dione cyclic acetal with acetone,
- 17α-methoxy-16-methylenepregna-4,6-diene-3,20-dione,
- 17α-methoxy-6-methyl-16-methylenepregna-4,6-diene-3,20-dione,
- 17α-hydroxy-16-methylenepregna-4,6-diene-3,20-dione,
- 16α-methylpregna-4,6-diene-3,20-dione,
- 6,16α-dimethylpregna-4,6-diene-3,20-dione, and
- 6,16α-dimethylpregna-4,6-diene-3,11,20-trione.

The following compounds were respectively obtained:

- 6,7-dimethylpregn-5-ene-3,20-dione,
- 17α-hydroxy-6,7-dimethylpregn-5-ene-3,20-dione,
- 6,7,17α-trimethylpregn-5-ene-3,20-dione,
- 16α,17α-dihydroxy-7-methylpregn-5-ene-3,20-dione cyclic acetal with acetone,
- 16α,17α-dihydroxy-6,7-dimethylpregn-5-ene-3,20-dione cyclic acetal with acetone,
- 17α-methoxy-7-methyl-16-methylenepregn-5-ene-3,20-dione,
- 17α-methoxy-6,7-dimethyl-16-methylenepregn-5-ene-3,20-dione,
- 17α-hydroxy-7-methyl-16-methylenepregn-5-ene-3,20-dione,
- 7,16α-dimethylpregn-5-ene-3,20-dione,
- 6,7,16α-trimethylpregn-5-ene-3,20-dione, and
- 6,7,16α-trimethylpregn-5-ene-3,11,20-trione.

EXAMPLE XVI

7α-methyl-9β,10α-pregn-5-ene-3,20-dione

A solution of lithium dimethylcopper was prepared under nitrogen by adding 76.5 ml of 1.6 M (0.122 mole) ethereal methyllithium to a slurry of 12.15 g (0.064 mole) of cuprous iodide suspended in 100 ml of anhydrous ether at 0°C. This solution was stirred at 0°C for 5 minutes to which a solution of 4.5 g (0.0153 mole) of 9β,10α-pregna-4,6-diene-3,20-dione in 100 ml of anhydrous tetrahydrofuran was added dropwise over a period of 2 minutes. The mixture was stirred for an additional 8 mintues and poured into 250 ml of a saturated aqueous ammonium chloride solution. Benzene was added and the mixture rapidly filtered through diatomaceous earth. The benzene layer was washed with a saturated aqueous ammonium chloride solution, washed with water, and dried over $MgSO_4$. Removal of the solvent under vacuum gave an oil which was dissolved in methylene chloride and rapidly chromatographed through a silica gel column packed in methylene chloride. The material which eluted with the solvent front was layered with hexane and filtered. Upon recrystallization from hexane the desired 7α-methyl-9β, 10α-pregn-5-ene-3,20-dione was obtained: mp 112°–116°C; uv max (EtOH) 287 nm (ε 5.2); ir (KBr) 1710–1685 cm$^{-1}$ (C=O); nmr (CDCl$_3$) δ 5.36 (m, C-6 H), 0.96 (d, C-7 CH$_3$, J = 7 Hz).

Anal. Calcd for $C_{22}H_{32}O_2$: C, 80.43; H, 9.82. Found: C, 80.21, 80.35; H, 9.80, 9.57.

Following this procedure an equivalent amount of the following compounds was substituted in lieu of 9β,10α-pregna-4,6-diene-3,20-dione:

- 20β-hydroxy-9β,10α-pregn-4,6-diene-3-one,
- 6-methyl-9β,10α-pregna-4,6-diene-3,20-dione,
- 17α-hydroxy-9β,10α-pregna-4,6-diene-3,20-dione, and
- 16α,17α-dihydroxy-9β,10α-pregna-4,6-diene-3,20-dione cyclic acetal with acetone.

The following compounds were correspondingly obtained:

- 20β-hydroxy-7-methyl-9β,10α-pregn-5-ene-3-one,
- 6,7-dimethyl-9β,10α-pregn-5-ene-3,20-dione,
- 17α-hydroxy-7-methyl-9β,10α-pregn-5-ene-3,20-dione, and
- 16α,17α-dihydroxy-7-methyl-9β,10α-pregn-5-ene-3,20-dione cyclic acetal with acetone.

The same procedure was followed but in lieu of 9β,10α-pregna-4,6-diene-3,20-dione the following 9β,10α-androsta-4,6-diene-3-ones were employed:

- 17β-hydroxy-4-methyl-9,10α-androsta-4,6-diene-3-one,
- 17β-hydroxy-4,17α-dimethyl-9β,10α-androsta-4,6-diene-3-one,
- 17β-hydroxy-6-methyl-9β,10α-androsta-4,6-diene-3-one,
- 17β-hydroxy-6,17α-dimethyl-9β,10α-androsta-4,6-diene-3-one,
- 9β,10α-androsta-4,6-diene-3,17-dione,
- 17β-hydroxy-17α-(2-methylallyl)-9β,10α-androsta-4,6-diene-3-one,
- 17β-hydroxy-9β,10α-androsta-4,6-diene-3-one,
- 17β-hydroxy-9β,10α-androsta-4,6-diene-3-one, acetate, 17β-hydroxy-9β,10α-androsta-4,6-diene-3-one, propionate,
- 17β-hydroxy-9β,10α-androsta-4,6-diene-3-one, hydrocinnamate, and 17β-hydroxy-9β,10α-androsta-4,6-diene-3-one, hydrosuccinate.

The following compounds were correspondingly obtained:

17β-hydroxy-4,7-dimethyl-9β,10α-androst-5-ene-3-one,
17β-hydroxy-4,7,17α-trimethyl-9β,10α-androst-5-ene-3-one,
17β-hydroxy-6,7-dimethyl-9β,10α-androst-5-ene-3-one,
17β-hydroxy-6,7,17α-trimethyl-9β,10α-androst-5-ene-3-one,
7-methyl-9β,10α-androst-5-ene-3,17-dione,
17β-hydroxy-7-methyl-17α-(2-methylallyl)-9β,10α-androst-5-ene-3-one,
17β-hydroxy-7-methyl-9β,10α-androst-5-ene-3-one,
17β-hydroxy-7-methyl-9β,10α-androst-5-ene-3-one, acetate,
17β-hydroxy-7-methyl-9β,10α-androst-5-ene-3-one, propionate,
17β-hydroxy-7-methyl-9β,10α-androst-5-ene-3-one, hydrocinnamate, and
17β-hydroxy-7-methyl-9β,10α-androst-5-ene-3-one, hydrosuccinate.

EXAMPLE XVII

An illustrative preparation of 10,000 tablets, each containing 10 milligrams of 17β-hydroxy-7α-methylandrost-5-ene-3-one is prepared as follows:

| | Gm. |
|---|---|
| 17β-hydroxy-7α-methylandrost-5-ene-3-one | 100 |
| Lactose | 1000 |
| Starch paste (10% w/v starch in water) | 100 |
| Starch | 32.5 |
| Calcium Stearate | 6.5 |

The steroid and lactose are uniformly mixed and granulated by the addition of the starch paste. The granules are dried at 120°F for 20 hours and forced through a No. 16 screen. The granules are lubricated by the addition of the starch and calcium stearate and compressed into tablets. Each tablet so prepared contains 10 milligrams of the steroid.

EXAMPLE XVIII

An illustrative composition for the preparation of 1,000 two-piece hard gelatin capsules, each capsule containing 1.0 milligrams of 17β-hydroxy-7α,17α-dimethylandrost-5-ene-3-one is prepared as follows:

| | Gm. |
|---|---|
| 17β-hydroxy-7α,17α-dimethylandrost-5-ene-3-one | 1.00 |
| Corn starch | 150 |
| Magnesium stearate | 25 |
| Hard gelatin capsules | 1000 |

The finely powdered ingredients are mixed until uniformly dispersed and filled into hard shell gelatin capsules of the appropriate size.

Similarly soft gelatin capsules may be prepared in which the above composition can be granulated, slugged or compressed directly into the rotary die or plate mold in which the soft gelatin capsule is formed.

EXAMPLE XIX 1000 grams of an ointment for topical application containing 0.1% of 7α-methyl-5-pregnen-3,20-dione can be prepared from the following ingredients:

| | Gm. |
|---|---|
| 7α-methyl-5-pregnen-3,20-dione | |
| Light liquid petrolatum | 250 |
| Wool fat | 200 |
| White petrolatum Q.s. ad 1000 | |

The wool fat, white petrolatum and 200 gms of the light liquid petrolatum are liquified and held at 110°F. The steroid is mixed with the remaining liquid petrolatum and passed through a colloid mill. After passing through the mill, the mixture is stirred into the melt. The melt is permitted to cool with continued stirring until congealed.

We claim:

1. A pharmaceutical composition in unit dosage form comprising from 0.1 milligram to 3.0 grams of a compound having the formula

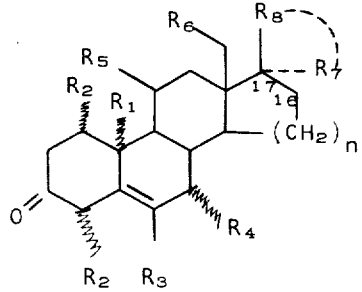

wherein
R₁ is selected from the group consisting of hydrogen and (α or β)-methyl with the proviso that when R₁ is α-methyl the 9-hydrogen is in the β-position, and when R₁ is β-methyl the 9-hydrogen is in the α-position, R₂ is individually selected from the group consisting of hydrogen and (α or β)-methyl, R₃ is hydrogen or methyl, R₄ is an (α or β)-loweralkyl group having from 1 to 3 carbon atoms inclusively, R₅ is hydrogen or oxo, R₆ is selected from the group consisting of hydrogen, methyl and ethyl, R₇ is selected from the group consisting of hydrogen, loweralkyl, alkenyl, alkynyl, alkadienyl, alkenylnyl and alkadiynyl, each haveing from 1 to 6 carbon atoms inclusively, R₈ is selected from the group consisting of hydrogen, 1-cyclopenten-1-yloxy, 1-methoxycyclohexyloxy, 2-tetrahydropyranyloxy, and the group —OR₉, wherein R₉ represents hydrogen or an acyl radical having from 1 to 12 carbon atoms inclusively with the proviso that R₇ and R₈ cannot both be hydrogen, that when R₇ is unsaturated R₈ cannot be the —OAcyl group, and with the further proviso that R₇ and R₈ when taken together are oxo or a cyclic ethylene acetal, n is the integer 1, and a pharmaceutical carrier.

2. The pharmaceutical composition of claim 1 wherein R₄ is α-methyl and R₂, R₃, R₅ and R₇ are hydrogen.

3. The pharmaceutical composition of claim 1 wherein the compound is 17β-hydroxy-7α-methylandrost-5-en-3-one.

4. The pharmaceutical composition of claim 1 wherein the compound is 6,7α-dimethyl-17β-hydroxy-17α-(1-propynyl)androst-5-en-3-one.

5. A pharmaceutical composition in unit dosage form comprising from 0.1 milligram to 3.0 grams of a compound having the formula

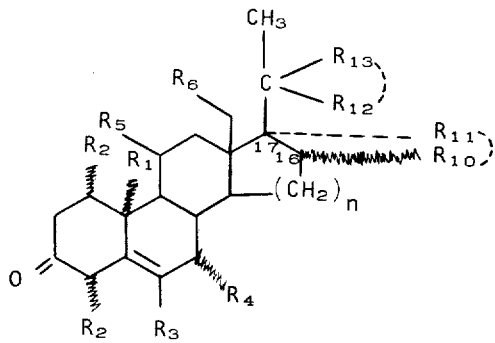

wherein $R_1$ is selected from the group consisting of hydrogen and (α or β)-methyl with the proviso that when $R_1$ is α-methyl the 9-hydrogen is in the β-position, and when $R_1$ is β-methyl the 9-hydrogen is in the α-position, $R_2$ is individually selected from the group consisting of hydrogen and (α or β)-methyl, $R_3$ is hydrogen or methyl, $R_4$ is (α or β)-loweralkyl group having 1 to 3 carbon atoms inclusively, $R_5$ is hydrogen or oxo, $R_6$ is selected from the group consisting of hydrogen, methyl and ethyl, $R_{10}$ is selected from the group consisting of hydrogen, methyl and methylene, $R_{11}$ is selected from the group consisting of hydrogen, methyl, ethyl, 2-tetrahydropyranyloxy and the group —$OR_9$, wherein $R_9$ represents hydrogen, a loweralkyl group having from 1 to 3 carbon atoms inclusively, and an acyl radical having from 1 to 12 carbon atoms inclusively, with the proviso that when $R_{10}$ is methylene, $R_{11}$ cannot be the —O—acyl group, and with the further proviso that $R_{10}$ and $R_{11}$ when taken together represent the 16α,17α-alkylidenedioxy group

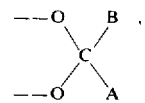

wherein A and B are each loweralkyl having from 1 to 4 carbon atoms inclusively, $R_{12}$ is selected from the group consisting of hydrogen, 1-cyclopenten-1-yloxy, 1-methoxycyclohexyloxy, 2-tetrahydropyranyloxy and the group —$OR_9$, wherein $R_9$ represents hydrogen and an acyl radical having from 1 to 12 carbon atoms inclusively, and which when taken together with $R_{13}$ is oxo, $R_{13}$ is hydrogen with the proviso that $R_{12}$ and $R_{13}$ cannot both be hydrogen, and which when taken together with $R_{12}$ is oxo, n is the integer 1, and a pharmaceutical carrier.

6. The pharmaceutical composition of claim 5 wherein the compound is 17α-hydroxy-7α-methyl-pregn-5-ene-3,20-dione acetate.

7. The pharmaceutical composition of claim 5 wherein the compound is 17α-hydroxy-6,7α-dimethyl-pregn-5-ene-3,20-dione acetate.

8. A method of controlling fertility in mammals which comprises the administration of a composition of claim 16 to said mammals in an effective amount for the control of fertility.

* * * * *

UNITED STATES PATENT AND TRADEMARK OFFICE
CERTIFICATE OF CORRECTION

Page 1 of 2

PATENT NO. : 3,917,831
DATED : November 4, 1975
INVENTOR(S) : Joyce F. Grunwell, Harvey D. Benson and Vladimir Petrow It is certified that error appears in the above-identified patent and that said Letters Patent are hereby corrected as shown below:

In the Title, "$\Delta 5$" should read "$\Delta^5$"; Column 1, line 45, "7($\alpha$,62)" should read "7($\alpha,\beta$)"; Column 2, line 19, "$\beta$-methyl" should read "$\alpha$-methyl"; Column 2, line 45, "$9\alpha$" should read "$9\beta$"; Column 3, line 55, "Thie" should read "This"; Column 4, line 10, "$7\alpha,17\beta$" should read "$7\beta,17\alpha$"; Column 6, line 1, "ann" should read "an"; Column 6, line 49, "$17\alpha$-dihydroxy" should read "$16\alpha,17\alpha$-dihydroxy"; Column 8, line 6, "1.6" should read "1:6"; Column 8, line 27, "soluent" should read "solvent"; Column 9, line 32, "structres" should read "structures"; Column 9, line 64, "7-($\alpha,\beta$)" should read "7($\alpha,\beta$)"; Column 10, line 17, "keton" should read "keto"; Column 10, line 39, "$\Delta$hu" should read "$\Delta^5$"; Column 11, line 19, "$C_1C_2, C_4$" should read "$C_1, C_2, C_4$"; Column 15, line 29, "cm" should read "$cm^{-1}$"; Column 15, line 55, "end" should read "ene"; Column 16, line 13, "0.°c" should read "0° C"; Column 16, line 31, "C=0," should read "C=0),"; Column 16, line 62, "$17\beta$hydroxy" should read "$17\beta$-hydroxy"; Column 17, line 14, "163°-1/3° C." should read "163°-166° C."; Column 17, line 48, "0.C" should read "0° C."; Column 17, line 49, "methly testosterone" should read "methyl testosterone"; Column 18, line 41, "The eluant" should read "The solid eluant"; Column 18, line 46, "$cm^-_1$" should read "$cm^{-1}$"; Column 18, line 51, "17-hydroxyandrosta" should read "$17\beta$-hydroxyandrosta"; Column 18, lines 52-53, "$17\beta$-hydroxy-$17\alpha$-androsta-4,6-dien-3-one" should read "$17\beta$-hydroxy-$17\alpha$-[1-(3-hydroxypropynyl)]-androsta-4,6-dien-3-one"; Column 19, line 64, "$17\eta$" should read "$17\beta$"; Column 20, line 45, "max" should read "uv max"; Column 21, line 7, "diemthyl" should read "dimethyl"; Column 22, line 6, "oxyl" should read "oxy"; Column 22, line 37, "diemthyl" should read "dimethyl"; Column 23, line 45 "($\delta$1270)" should read "($\epsilon$1270)";

UNITED STATES PATENT AND TRADEMARK OFFICE
CERTIFICATE OF CORRECTION

PATENT NO. : 3,917,831

DATED : November 4, 1975

INVENTOR(S) : Joyce F. Grunwell, Harvey D. Benson and Vladimir Petrow

It is certified that error appears in the above-identified patent and that said Letters Patent are hereby corrected as shown below:

Column 28, line 4, "pregen" should read "pregnen"; Column 28, line 8, the first missing amount under Gm. for the first ingredient should read "1"; Column 28, line 51, "haveing" should read "having"; Column 30, line 36, "claim 16" should read "claim 2".

Signed and Sealed this

Twenty-first Day of September 1976

[SEAL]

Attest:

RUTH C. MASON
*Attesting Officer*

C. MARSHALL DANN
*Commissioner of Patents and Trademarks*